United States Patent
Usher

(10) Patent No.: US 11,432,065 B2
(45) Date of Patent: Aug. 30, 2022

(54) AUTOMATIC KEYWORD PASS-THROUGH SYSTEM

(71) Applicant: Staton Techiya LLC, Lighthouse Point, FL (US)

(72) Inventor: John Usher, Beer (GB)

(73) Assignee: Staton Techiya, LLC, Delray Beach, FL (US)

( * ) Notice: Subject to any disclaimer, the term of this patent is extended or adjusted under 35 U.S.C. 154(b) by 0 days.

(21) Appl. No.: 17/172,065

(22) Filed: Feb. 9, 2021

(65) Prior Publication Data

US 2021/0168491 A1 Jun. 3, 2021

Related U.S. Application Data

(63) Continuation of application No. 16/555,824, filed on Aug. 29, 2019, now Pat. No. 10,966,015, which is a continuation of application No. 16/168,752, filed on Oct. 23, 2018, now Pat. No. 10,405,082.

(60) Provisional application No. 62/575,713, filed on Oct. 23, 2017.

(51) Int. Cl.
*H03B 29/00* (2006.01)
*H04R 1/10* (2006.01)
*G10L 15/22* (2006.01)
*G10L 15/00* (2013.01)

(52) U.S. Cl.
CPC ............ *H04R 1/1083* (2013.01); *G10L 15/00* (2013.01); *G10L 15/22* (2013.01); *H04R 1/1075* (2013.01)

(58) Field of Classification Search
CPC .................................................. H03B 29/00
See application file for complete search history.

(56) References Cited

U.S. PATENT DOCUMENTS

| | | | |
|---|---|---|---|
| 3,876,843 | A | 4/1975 | Moen |
| 4,054,749 | A | 10/1977 | Suzuki et al. |
| 4,088,849 | A | 5/1978 | Usami et al. |
| 4,237,343 | A | 12/1980 | Kurtin et al. |
| 4,947,440 | A | 8/1990 | Bateman et al. |

(Continued)

FOREIGN PATENT DOCUMENTS

| | | |
|---|---|---|
| EP | 1519625 A2 | 3/2005 |
| JP | 5639160 | 12/2014 |

(Continued)

OTHER PUBLICATIONS

Olwal, A. and Feiner S. Interaction Techniques Using Prosodic Features of Speech and Audio Localization. Proceedings of IUI 2005 (International Conference on Intelligent User Interfaces), San Diego, CA, Jan. 9-12, 2005, p. 284-286.

(Continued)

*Primary Examiner* — Olisa Anwah
(74) *Attorney, Agent, or Firm* — Akerman LLP; Peter A. Chiabotti

(57) ABSTRACT

At least one embodiment is directed to a method for automatically activating ambient sound pass-through in an earphone in response to a detected keyword in the ambient sound field of the earphone user, the steps of the method comprising at least receiving at least one ambient sound microphone (ASM) signal; receiving at least one audio content (AC) signal; and comparing the ASM signal to a keyword and if the ASM signal matches a keyword then an AC gain is created.

20 Claims, 4 Drawing Sheets

(56) References Cited

U.S. PATENT DOCUMENTS

| | | | |
|---|---|---|---|
| 5,208,867 A | 5/1993 | Stites, III | |
| 5,267,321 A | 11/1993 | Langberg | |
| 5,524,056 A | 6/1996 | Killion et al. | |
| 5,852,804 A | 12/1998 | Sako | |
| 5,903,868 A | 5/1999 | Yuen et al. | |
| 6,021,207 A | 2/2000 | Puthuff et al. | |
| 6,021,325 A | 2/2000 | Hall | |
| 6,094,489 A | 7/2000 | Ishige et al. | |
| 6,163,338 A | 12/2000 | Johnson et al. | |
| 6,163,508 A | 12/2000 | Kim et al. | |
| 6,226,389 B1 | 5/2001 | Lemelson et al. | |
| 6,298,323 B1 | 10/2001 | Kaemmerer | |
| 6,359,993 B2 | 3/2002 | Brimhall | |
| 6,400,652 B1 | 6/2002 | Goldberg et al. | |
| 6,415,034 B1 | 7/2002 | Hietanen | |
| 6,567,524 B1 | 5/2003 | Svean et al. | |
| 6,618,073 B1 | 9/2003 | Lambert et al. | |
| RE38,351 E | 12/2003 | Iseberg et al. | |
| 6,661,901 B1 | 12/2003 | Svean et al. | |
| 6,728,385 B2 | 4/2004 | Kvaloy et al. | |
| 6,748,238 B1 | 6/2004 | Lau | |
| 6,754,359 B1 | 6/2004 | Svean et al. | |
| 6,804,638 B2 | 10/2004 | Fiedler | |
| 6,804,643 B1 | 10/2004 | Kiss | |
| 7,072,476 B2 | 7/2006 | White et al. | |
| 7,072,482 B2 | 7/2006 | Van Doorn et al. | |
| 7,107,109 B1 | 9/2006 | Nathan et al. | |
| 7,158,933 B2 | 1/2007 | Blan | |
| 7,174,022 B1 | 2/2007 | Zhang et al. | |
| 7,209,569 B2 | 4/2007 | Boesen | |
| 7,346,176 B1 | 3/2008 | Bernardi et al. | |
| 7,430,299 B2 | 9/2008 | Armstrong et al. | |
| 7,433,714 B2 | 10/2008 | Howard et al. | |
| 7,450,730 B2 | 11/2008 | Bertg et al. | |
| 7,477,756 B2 | 1/2009 | Wickstrom et al. | |
| 7,555,130 B2 | 6/2009 | Klayman | |
| 7,562,020 B2 | 6/2009 | Le et al. | |
| 7,672,845 B2 | 3/2010 | Beranek et al. | |
| 7,756,285 B2 | 7/2010 | Sjursen et al. | |
| 7,778,434 B2 | 8/2010 | Juneau et al. | |
| 7,853,031 B2 | 12/2010 | Hamacher | |
| 7,920,557 B2 | 4/2011 | Moote | |
| 8,014,553 B2 | 9/2011 | Radivojevic et al. | |
| 8,098,844 B2 | 1/2012 | Elko | |
| 8,391,501 B2 | 3/2013 | Khawand et al. | |
| 8,401,206 B2 | 3/2013 | Seltzer et al. | |
| 8,467,543 B2 | 6/2013 | Burnett et al. | |
| 8,493,204 B2 | 7/2013 | Wong et al. | |
| 8,503,704 B2 | 8/2013 | Francart et al. | |
| 8,583,428 B2 | 11/2013 | Tashev et al. | |
| 8,600,454 B2 | 12/2013 | Nicholson | |
| 8,606,571 B1 | 12/2013 | Every et al. | |
| 8,611,560 B2 | 12/2013 | Goldstein et al. | |
| 8,625,819 B2 | 1/2014 | Goldstein et al. | |
| 8,750,295 B2 | 6/2014 | Liron | |
| 9,037,458 B2 | 5/2015 | Park et al. | |
| 9,123,343 B2 | 9/2015 | Kurki-Suonio | |
| 9,135,797 B2 | 9/2015 | Couper et al. | |
| 9,961,435 B1 | 5/2018 | Goyal et al. | |
| 10,045,112 B2 | 8/2018 | Boesen et al. | |
| 10,045,117 B2 | 8/2018 | Boesen et al. | |
| 10,063,957 B2 | 8/2018 | Boesen et al. | |
| 10,884,696 B1* | 1/2021 | Willis | G10L 25/51 |
| 2001/0046304 A1 | 11/2001 | Rast | |
| 2002/0106091 A1 | 8/2002 | Furst et al. | |
| 2002/0118798 A1 | 8/2002 | Langhart et al. | |
| 2003/0035551 A1 | 2/2003 | Light et al. | |
| 2003/0161097 A1 | 8/2003 | Le et al. | |
| 2003/0165246 A1 | 9/2003 | Kvaloy et al. | |
| 2004/0042103 A1 | 3/2004 | Mayer | |
| 2004/0109668 A1 | 6/2004 | Stuckman | |
| 2004/0125965 A1 | 7/2004 | Alberth, Jr. et al. | |
| 2004/0190737 A1 | 9/2004 | Kuhnel et al. | |
| 2004/0196992 A1 | 10/2004 | Ryan | |
| 2004/0203351 A1 | 10/2004 | Shearer et al. | |
| 2005/0058313 A1 | 3/2005 | Victorian et al. | |
| 2005/0078838 A1 | 4/2005 | Simon | |
| 2005/0123146 A1 | 6/2005 | Voix et al. | |
| 2005/0175189 A1 | 8/2005 | Lee et al. | |
| 2005/0288057 A1 | 12/2005 | Lai et al. | |
| 2006/0067551 A1 | 3/2006 | Cartwright et al. | |
| 2006/0074693 A1 | 4/2006 | Yamashita | |
| 2006/0083395 A1 | 4/2006 | Allen et al. | |
| 2006/0092043 A1 | 5/2006 | Lagassey | |
| 2006/0133621 A1 | 6/2006 | Chen et al. | |
| 2006/0195322 A1 | 8/2006 | Broussard et al. | |
| 2006/0204014 A1 | 9/2006 | Isenberg et al. | |
| 2007/0021958 A1 | 1/2007 | Visser et al. | |
| 2007/0033029 A1 | 2/2007 | Sakawaki | |
| 2007/0043563 A1 | 2/2007 | Comerford et al. | |
| 2007/0049361 A1 | 3/2007 | Coote et al. | |
| 2007/0053522 A1 | 3/2007 | Murray et al. | |
| 2007/0076896 A1 | 4/2007 | Hosaka et al. | |
| 2007/0076898 A1 | 4/2007 | Sarroukh et al. | |
| 2007/0086600 A1 | 4/2007 | Boesen | |
| 2007/0088544 A1 | 4/2007 | Acero et al. | |
| 2007/0098192 A1 | 5/2007 | Sipkema | |
| 2007/0189544 A1* | 8/2007 | Rosenberg | H03G 3/32 381/104 |
| 2007/0230712 A1 | 10/2007 | Belt et al. | |
| 2007/0237341 A1 | 10/2007 | Laroche | |
| 2007/0291953 A1 | 12/2007 | Ngia et al. | |
| 2008/0037801 A1 | 2/2008 | Alves et al. | |
| 2008/0137873 A1 | 6/2008 | Goldstein | |
| 2008/0147397 A1 | 6/2008 | Konig et al. | |
| 2008/0165988 A1 | 7/2008 | Terlizzi et al. | |
| 2008/0181419 A1 | 7/2008 | Goldstein et al. | |
| 2008/0187163 A1 | 8/2008 | Goldstein et al. | |
| 2008/0260180 A1 | 10/2008 | Goldstein et al. | |
| 2008/0317259 A1 | 12/2008 | Zhang et al. | |
| 2009/0010444 A1 | 1/2009 | Goldstein et al. | |
| 2009/0010456 A1 | 1/2009 | Goldstein et al. | |
| 2009/0024234 A1 | 1/2009 | Archibald | |
| 2009/0209290 A1 | 8/2009 | Chen et al. | |
| 2010/0061564 A1 | 3/2010 | Clemow et al. | |
| 2010/0296668 A1 | 11/2010 | Lee et al. | |
| 2011/0096939 A1 | 4/2011 | Ichimura | |
| 2011/0135107 A1 | 6/2011 | Konchitsky | |
| 2011/0206217 A1 | 8/2011 | Wels | |
| 2011/0264447 A1 | 10/2011 | Visser et al. | |
| 2011/0293103 A1 | 12/2011 | Park et al. | |
| 2016/0104452 A1 | 4/2016 | Guan et al. | |
| 2017/0142511 A1 | 5/2017 | Dennis | |
| 2018/0192179 A1* | 7/2018 | Liu | G10K 11/178 |
| 2018/0206025 A1 | 7/2018 | Rule | |
| 2018/0233125 A1 | 8/2018 | Mitchell et al. | |
| 2019/0069069 A1* | 2/2019 | Radin | H03G 3/32 |

FOREIGN PATENT DOCUMENTS

| | | |
|---|---|---|
| WO | 2006037156 A1 | 4/2006 |
| WO | 2007085307 | 8/2007 |
| WO | 2012078670 | 6/2012 |

OTHER PUBLICATIONS

Bernard Widrow, John R. Glover Jr., John M. McCool, John Kaunitz, Charles S. Williams, Robert H. Hearn, James R. Zeidler, Eugene Dong Jr, and Robert C. Goodlin, Adaptive Noise Cancelling: Principles and Applications, Proceedings of the IEEE, vol. 63, No. 12, Dec. 1975.

Mauro Dentino, John M. McCool, and Bernard Widrow, Adaptive Filtering in the Frequency Domain, Proceedings of the IEEE, vol. 66, No. 12, Dec. 1978.

*Samsung Electronics Co., Ltd., and Samsung Electronics, America, Inc., v. Staton Techiya, LLC,* IPR2022-00282, Dec. 21, 2021.

*Samsung Electronics Co., Ltd., and Samsung Electronics, America, Inc., v. Staton Techiya, LLC,* IPR2022-00242, Dec. 23, 2021.

*Samsung Electronics Co., Ltd., and Samsung Electronics, America, Inc., v. Staton Techiya, LLC,* IPR2022-00243, Dec. 23, 2021.

*Samsung Electronics Co., Ltd., and Samsung Electronics, America, Inc., v. Staton Techiya, LLC,* IPR2022-00234, Dec. 21, 2021.

(56) References Cited

OTHER PUBLICATIONS

*Samsung Electronics Co., Ltd., and Samsung Electronics, America, Inc.,* v. *Staton Techiya, LLC,* IPR2022-00253, Jan. 18, 2022.
*Samsung Electronics Co., Ltd., and Samsung Electronics, America, Inc.,* v. *Staton Techiya, LLC,* IPR2022-00324, Jan. 13, 2022.
*Samsung Electronics Co., Ltd., and Samsung Electronics, America, Inc.,* v. *Staton Techiya, LLC,* IPR2022-00281, Jan. 18, 2022.
*Samsung Electronics Co., Ltd., and Samsung Electronics, America, Inc.,* v. *Staton Techiya, LLC,* IPR2022-00302, Jan. 13, 2022.
*Samsung Electronics Co., Ltd., and Samsung Electronics, America, Inc.,* v. *Staton Techiya, LLC,* IPR2022-00369, Feb. 18, 2022.
*Samsung Electronics Co., Ltd., and Samsung Electronics, America, Inc.,* v. *Staton Techiya, LLC,* IPR2022-00388, Feb. 18, 2022.
*Samsung Electronics Co., Ltd., and Samsung Electronics, America, Inc.,* v. *Staton Techiya, LLC,* IPR2022-00410, Feb. 18, 2022.

\* cited by examiner

AUTOMATIC KEYWORD PASS-THROUGH SYSTEM

CROSS-REFERENCE TO RELATED APPLICATIONS

This application is a continuation of and claims priority benefit to U.S. patent application Ser. No. 16/555,824, filed 29 Aug. 2019, which is a continuation of and claims priority to U.S. patent Ser. No. 16/168,752, filed 23 Oct. 2018, which is a non-provisional of and claims priority to U.S. Patent Application Ser. No. 62/575,713 filed 23 Oct. 2017, the disclosures of which are herein incorporated by reference in their entirety.

FIELD OF THE INVENTION

The present invention relates to acoustic keyword detection and passthrough, though not exclusively, devices that can be acoustically controlled or interacted with.

BACKGROUND OF THE INVENTION

Sound isolating (SI) earphones and headsets are becoming increasingly popular for music listening and voice communication. SI earphones enable the user to hear and experience an incoming audio content signal (be it speech from a phone call or music audio from a music player) clearly in loud ambient noise environments, by attenuating the level of ambient sound in the user ear-canal.

The disadvantage of such SI earphones/headsets is that the user is acoustically detached from their local sound environment, and communication with people in their immediate environment is therefore impaired. If a second individual in the SI earphone user's ambient environment wishes to talk with the SI earphone wearer, the second individual must often shout loudly in close proximity to the SI earphone wearer, or otherwise attract the attention of said SI earphone wearer e.g. by being in visual range. Such a process can be time-consuming, dangerous or difficult in critical situations. A need therefore exists for a "hands-free" mode of operation to enable an SI earphone wearer to detect when a second individual in their environment wishes to communicate with them.

WO2007085307 describes a system for directing ambient sound through an earphone via non-electronic means via a channel, and using a switch to select whether the channel is open or closed.

Application US 2011/0206217 A1 describes a system to electronically direct ambient sound to a loudspeaker in an earphone, and to disable this ambient sound pass-through during a phone call.

US 2008/0260180 A1 describes an earphone with an ear-canal microphone and ambient sound microphone to detect user voice activity.

U.S. Pat. No. 7,672,845 B2 describes a method and system to monitor speech and detect keywords or phrases in the speech, such as for example, monitored calls in a call center or speakers/presenters using teleprompters.

But the above art does not describe a method to automatically pass-through ambient sound to an SI earphone wearer when a key word is spoken to the SI earphone wearer.

BRIEF DESCRIPTION OF THE DRAWINGS

Exemplary embodiments of present invention will become more fully understood from the detailed description and the accompanying drawings, wherein.

DETAILED DESCRIPTION OF EXEMPLARY EMBODIMENTS

The following description of exemplary embodiment(s) is merely illustrative in nature and is in no way intended to limit the invention, its application, or uses.

At least one embodiment is directed to a system for detecting a keyword spoken in a sound environment and alerting a user to the spoken keyword. In one embodiment as an earphone system: an earphone typically occludes the earphone user's ear, reducing the ambient sound level in the user's ear canal. Audio content signal reproduced in the earphone by a loudspeaker, e.g. incoming speech audio or music, further reduces the earphone user's ability to understand, detect or otherwise experience keywords in their environment, e.g. the earphone user's name as vocalized by someone who is in the users close proximity. At least one ambient sound microphone, e.g. located on the earphone or a mobile computing device, directs ambient sound to a key word analysis system, e.g. an automatic speech recognition system. When the key word analysis system detects a keyword, sound from an ambient sound microphone is directed to the earphone loudspeaker and (optionally) reduces the level of audio content reproduced on the earphone loudspeaker, thereby allowing the earphone wearer to hear the spoken keyword in their ambient environment, perform an action such as placing a emergency call upon the detection of a keyword, attenuating the level of or pausing reproduced music.

In another embodiment, keyword detection for mobile cell phones is enabled using the microphone resident on the phone configured to detect sound and direct the sound to a keyword detection system. Often phones are carried in pockets and other sound-attenuating locations, reducing the effectiveness of a keyword detection system when the built-in phone microphone is used. A benefit of using the ambient microphones on a pair of earphones is that of increasing signal to noise ratio (SNR). Using a pair of microphones can enhance the SNR using directional enhancement algorithms, e.g. beam-forming algorithms: improving the key word detection rate (e.g. decreasing false positives and false negatives). Another location for microphones to innervate a keyword detection system are on other body worn media devices such as glasses, heads up display or smart-watches.

Figure 1:
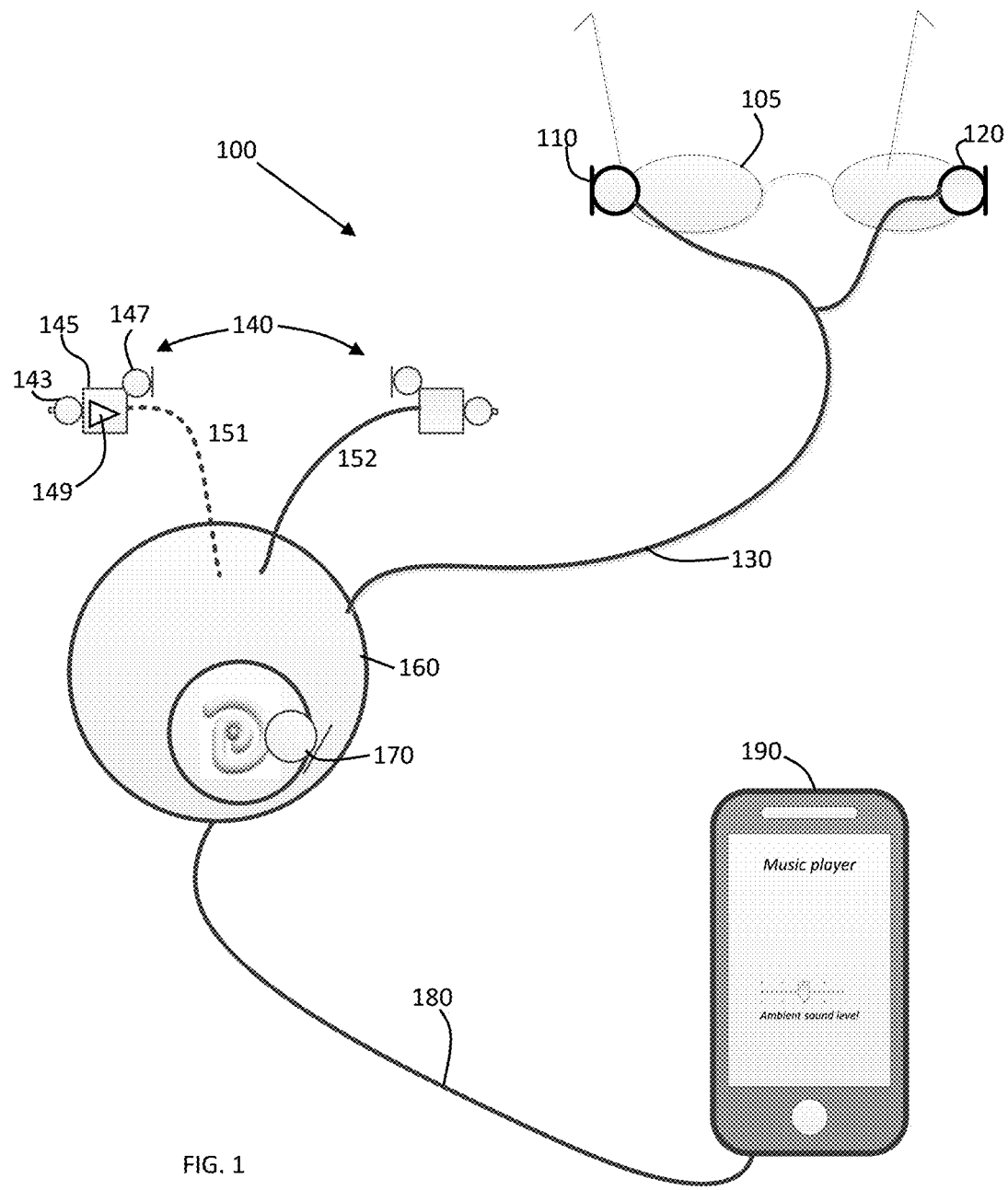
FIG. 1 illustrates audio hardware system.

FIG. 1 illustrates one exemplary embodiment of the present invention 100, there exists a communication earphone/headset system (140-150, and 110-120) connected to a voice communication device (e.g. mobile telephone, radio, computer device) and/or audio content delivery device 190 (e.g. portable media player, computer device). Said communication earphone/headset system comprises a sound isolating component 145 for blocking the users ear meatus (e.g. using foam or an expandable balloon); an Ear Canal Receiver 149 (ECR, i.e. loudspeaker) for receiving an audio signal and generating a sound field in a user ear-canal; at least one ambient sound microphone (ASM) 147 for receiving an ambient sound signal and generating at least one ASM signal; and an optional Ear Canal Microphone (ECM) 143 for receiving an ear-canal signal measured in the user's occluded ear-canal and generating an ECM signal. The earphone can be connected via wirelessly 151 (e.g., via RF or Bluetooth) or via cable 152.

Figure 2:
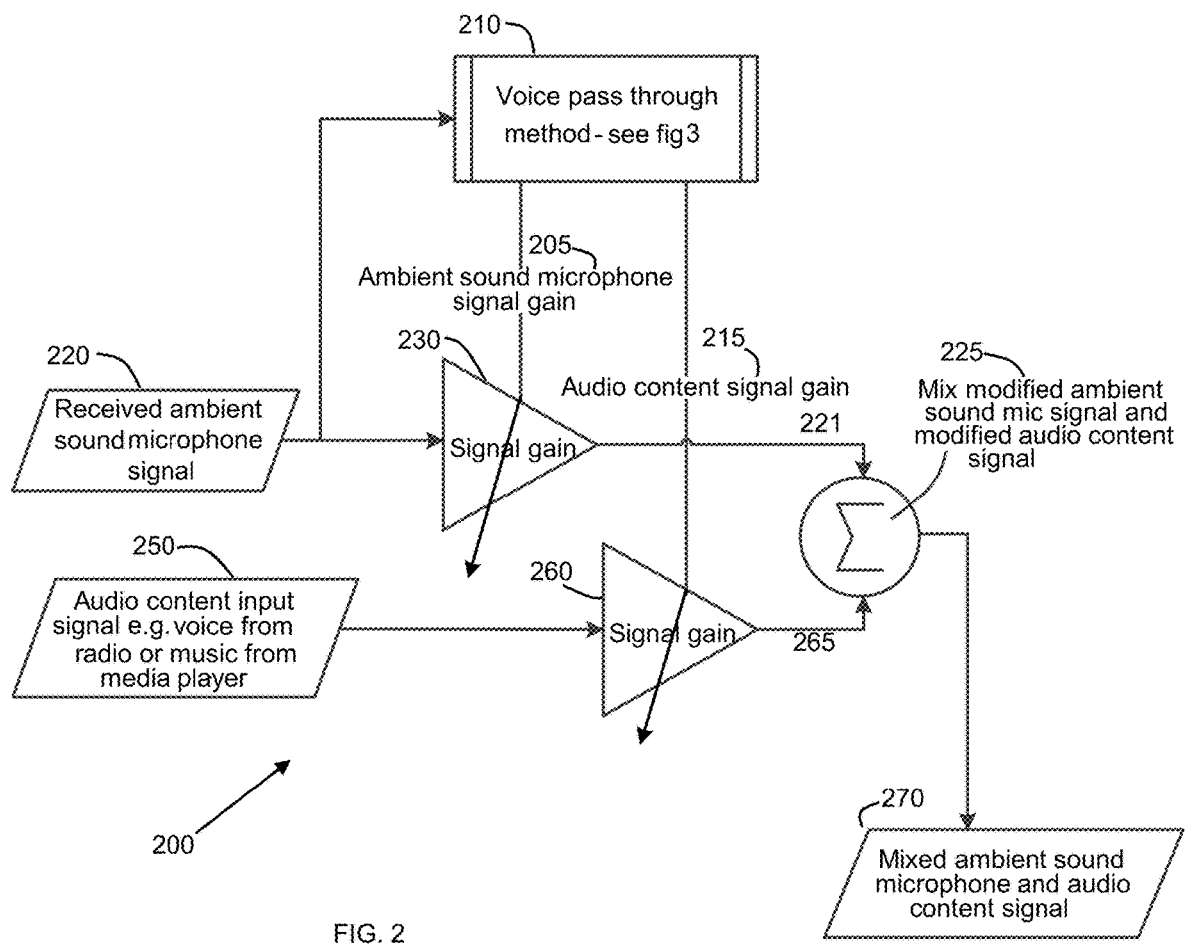
FIG. 2 illustrates a method for mixing ambient sound microphone with audio content.

At least one exemplary embodiment is directed to a signal processing system is directed to an Audio Content (AC) signal (e.g. music or speech audio signal) from the said communication device 190 (e.g. mobile phone etc.) or said audio content delivery device 160 (e.g. music player); and further receives the at least one ASM signal and the optional ECM signal. Said signal processing system mixes the at least one ASM and AC signal and transmits the resulting mixed signal to the ECR in the loudspeaker. The mixing of the at least one ASM and AC signal is controlled by voice activity of the earphone wearer. FIG. 2 illustrates a method 200 for mixing ambient sound microphone with audio content. First an ambient sound is measured by the ambient sound microphone 147 and converted into an ambient sound microphone signal 220. The ambient sound signal is sent to a voice pass through method 210 and to a signal gain amplifier 230 which adds gain to an ambient sound signal 205. Audio content 250 can be sent to a signal gain amplifier 260. The gained ambient sound signal and the gained audio content can be mixed 240 forming a mixed modified ambient sound microphone signal and a modified audio content signal 225 which is formed into a combined signal 270.

According to a preferred embodiment, the ASM signal of the earphone is directed to a Keyword Detection System (KDS). Keyword Detection is a process known to those skilled in the art and can be accomplished by various means, for example the system described by U.S. Pat. No. 7,672,845 B2. A KDS typically detects a limited number of spoken keywords (e.g. less than 20 keywords), however the number of keywords is not intended to be limitative in the present invention. In the preferred embodiment, examples of such keywords are at least one of the following keywords:

1. A first name (i.e. a "given name" or "Christian name", e.g. "John", "Steve", "Yadira"), where this is the first name of the earphone wearer.
2. A surname (i.e. a second name or "family name", e.g. "Usher", "Goldstein"), where this is the surname of the earphone wearer.
3. A familiar or truncated form of the first name or surname (e.g. "Johnny", "Jay", "Stevie-poos").
4. A nickname for the earphone wearer.
5. An emergency keyword not associated with the earphone wearer, such as "help", "assist", "emergency".

In another embodiment, the ambient sound microphone is located on a mobile computing device 190, e.g. a smart phone.

In yet another embodiment, the ambient sound microphone is located on an earphone cable.

In yet another embodiment, the ambient sound microphone is located on a control box.

In yet another embodiment, the ambient sound microphone is located on a wrist-mounted computing device.

In yet another embodiment, the ambient sound microphone is located on an eye-wear system, e.g. electronic glasses used for augmented reality.

In the present invention, when at least one keyword is detected the level of the ASM signal fed to the ECR is increased. In a preferred embodiment, when voice activity is detected, the level of the AC signal fed to the ECR is also decreased.

In a preferred embodiment, following cessation of detected user voice activity, and following a "pre-fade delay" the level of the ASM signal fed to the ECR is decreased and the level of the AC signal fed to the ECR is increased. In a preferred embodiment, the time period of the "pre-fade delay" is a proportional to the time period of continuous user voice activity before cessation of the user voice activity, and the "pre-fade delay" time period is bound below an upper limit, which in a preferred embodiment is 10 seconds.

In a preferred embodiment, the location of the ASM is at the entrance to the ear meatus.

The level of ASM signal fed to the ECR is determined by an ASM gain coefficient, which in one embodiment may be frequency dependent.

The level of AC signal fed to the ECR is determined by an AC gain coefficient, which in one embodiment may be frequency dependent.

In a one embodiment, the rate of gain change (slew rate) of the ASM gain and AC gain in the mixing circuit are independently controlled and are different for "gain increasing" and "gain decreasing" conditions.

In a preferred embodiment, the slew rate for increasing and decreasing "AC gain" in the mixing circuit is approximately 5-30 dB and −5 to −30 dB per second (respectively).

In a preferred embodiment, the slew rate for increasing and decreasing "ASM gain" in the mixing circuit is inversely proportional to the AC gain (e.g., on a linear scale, the ASM gain is equal to the AC gain subtracted from unity).

Figure 4:
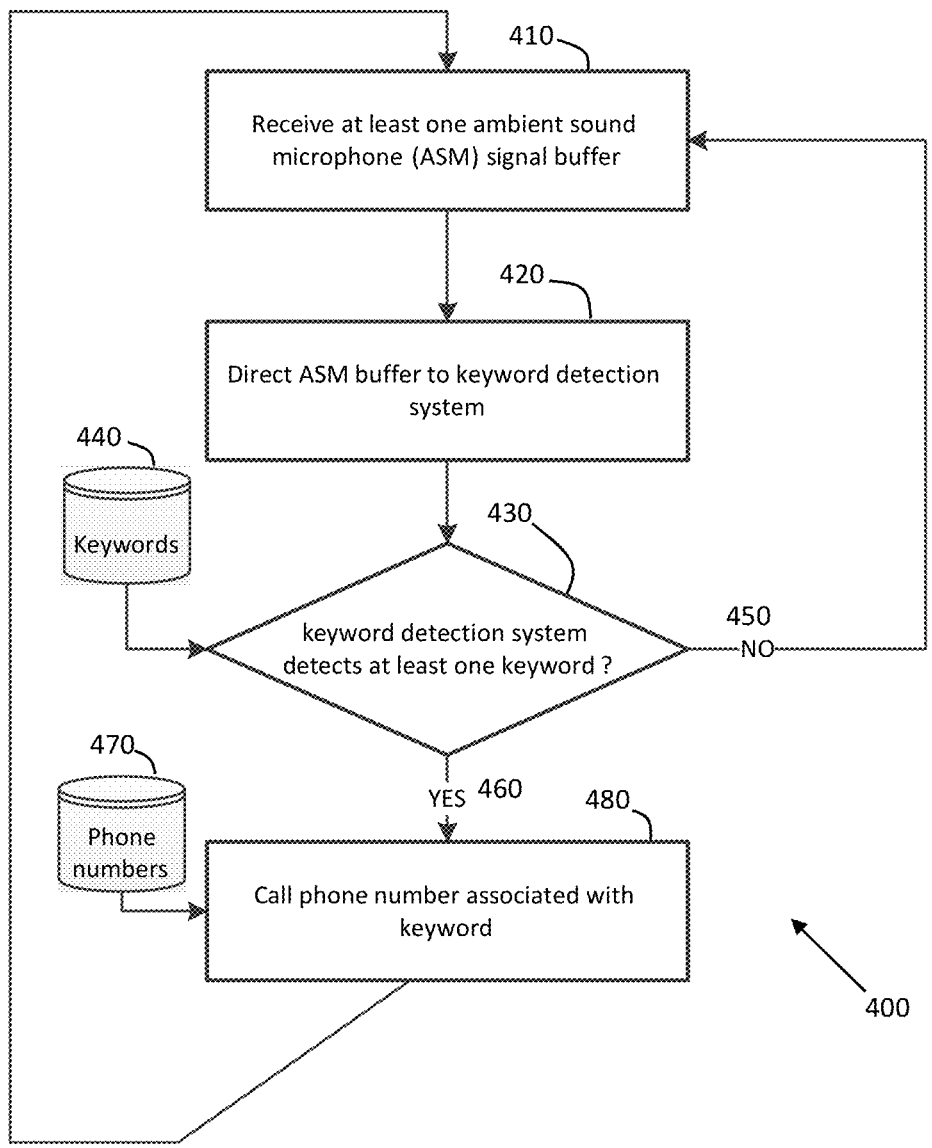
FIG. 4 illustrates a method for keyword detection to make a phone call.

In another embodiment, described in FIG. 4, a list of keywords is associated with a list of phone numbers. When a keyword is detected, the associated phone number is automatically called. In another configuration, when a pre-recorded voice message may be directed to the called phone number.

Exemplary methods for detecting keywords are presented are familiar to those skilled in the art, for example U.S. Pat. No. 7,672,845 B2 describes a method and system to monitor speech and detect keywords or phrases in the speech, such as for example, monitored calls in a call center or speakers/presenters using teleprompters.

Figure 3:
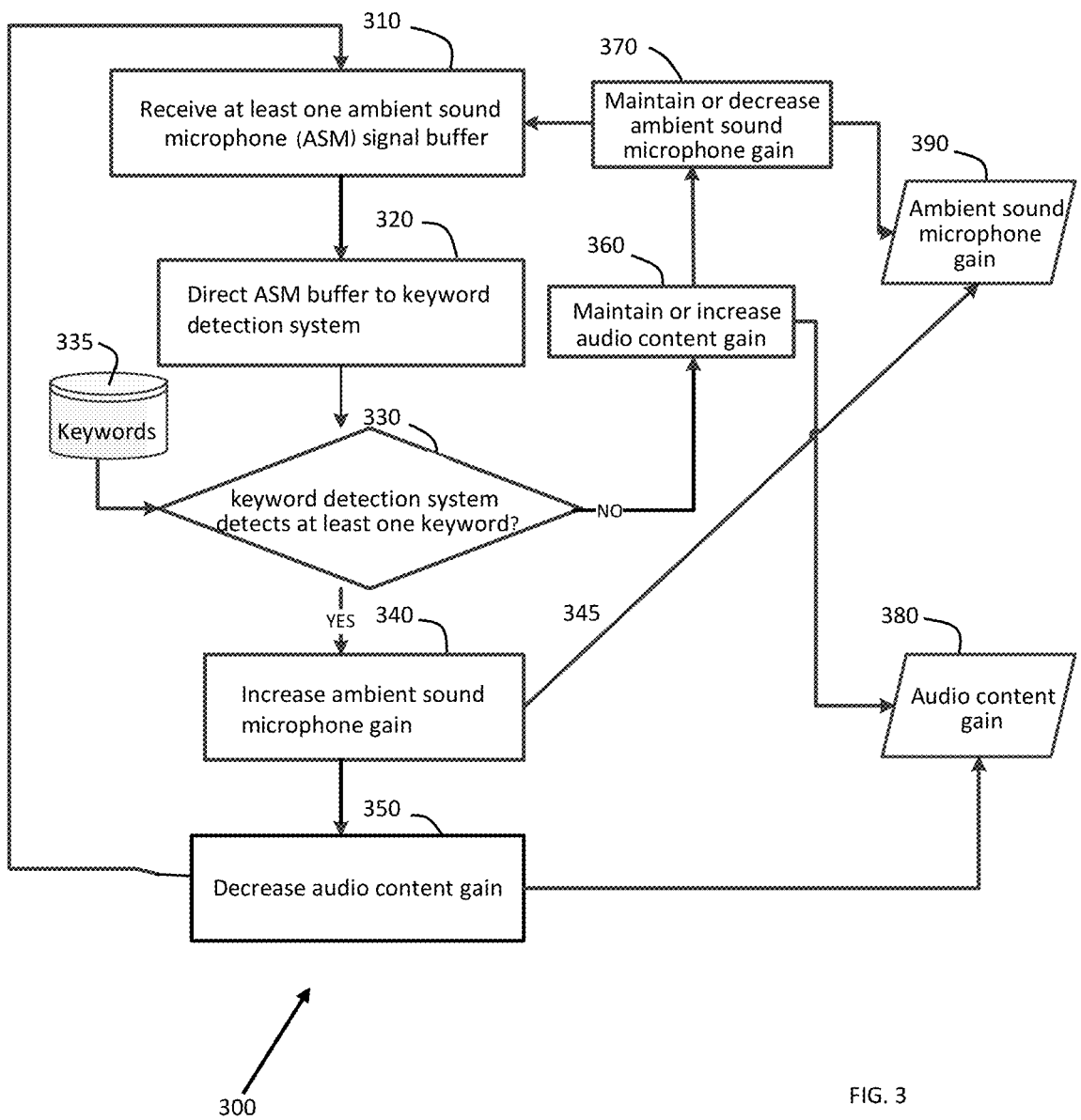
FIG. 3 illustrates a method for keyword detection to adjust audio gain.

FIG. 3 illustrates at least one embodiment which is directed to a method 300 for automatically activating ambient sound pass-through in an earphone in response to a detected keyword in the ambient sound field of the earphone user, the steps of the method comprising:

Step 1 (310): Receive at least one ambient sound microphone (ASM) signal buffer and at least one audio content (AC) signal buffer.

Step 2 (320): Directing the ASM buffer to keyword detection system (KDS).

Step 3 (330): Generating an AC gain determined by the KDS. If the KDS determined a keyword is detected, then the AC gain value is decreased and is optionally increased when a keyword is not detected. The step of detecting a keyword compares the ambient sound microphone signal buffer (ASMSB) to keywords stored in computer accessible memory 335. For example, the ambient ASMSB can be parsed into temporal sections, and the spectral characteristics of the signal obtained (e.g., via FFT). A keyword's temporal characteristics and spectral characteristics can then be compared to the temporal and spectral characteristics of the ASMSB. The spectral amplitude can be normalized so that spectral values can be compared. For example, the power density at a target frequency can be used, and the power density of the ASMSB at the target frequency can modified to match the keywords. Then the patterns compared. If the temporal and/or spectral patterns match within a threshold average value (e.g., +/−3 dB) then the keyword can be identified. Note that all of the keywords can also be matched at the target frequency so that comparison of the modified spectrum of the ASMSB can be compared to all keywords. For example suppose all keywords and the ASMSB are stored as spectrograms (amplitude or power density within a frequency bin vs time) where the frequency bins are for example 100 Hz, and the temporal extend is match (for example a short keyword and a long keyword have different temporal durations, but to compare the beginning and end can be stretched or compressed into a common temporal extent, e.g. 1 sec, with 0.01 sec bins, e.g., can also be the same size as the ASMSB buffer signal length). If the target frequency is 1000 Hz-1100 Hz bin at 0.5-0.51 sec bin, then all bins can be likewise increased or decreased to the target amplitude or power density, for example 85 dB. Then the modified spectrogram of the ASMSB can be subtracted from the keyword spectrums and the absolute value sum compared against a threshold to determine if a keyword is detected. Note that various methods can be used to simplify calculations, for example ranges can be assigned integer values corresponding to the uncertainty of measurement, for example an uncertainty value of +/−2 dB, a value in the range of 93 dB to 97 dB can be assigned a value of 95 dB, etc. . . . . Additionally, all values less than a particular value say 5 dB above the average noise floor can be set to 0. Hence the spectrograms become a matrix of integers that can then be compared. The sum of absolute differences can also be amongst selected matrix cells identified as particularly identifying. Note that discussion herein is not intended to limit the method of KDS.

Step 4 (340): Generating an ASM gain determined by the KDS. If the KDS determined a keyword is detected, then the ASM gain value 390 is increased 340 or optionally is decreased 370 when a keyword is not detected.

Step 5 (345): Applying the AC gain (215, FIG. 2; 380, FIG. 3) to the received AC signal 250 (FIG. 2) to generate a modified AC signal 265.

Steps 6 (230 and 260): Applying the ASM gain (205, FIG. 2; 390, FIG. 3) to the received ASM signal 220 (FIG. 2) to generate a modified ASM signal 221 (FIG. 2).

Step 7 (225): Mixing the modified AC signal 265 and modified ASM signals 221 to generate a mixed signal 270.

Step 8: Directing the generated mixed signal of step 7 to an Ear Canal Receiver (ECR).

At least one further embodiment is further directed to where the AC gain of step 3 and the ASM gain of step 4 is limited to an upper value and optionally a lower value.

At least one further embodiment is further directed to where the received AC signal of step 1 is received via wired or wireless means from at least one of the following non-limiting devices: smart phone, telephone, radio, portable computing device, portable media player.

At least one further embodiment is further directed to where the ambient sound microphone signal is from an ambient sound microphone located on at least one of the following:

An earphone;
on a mobile computing device, e.g. a smart phone;
on an earphone cable;
on a control box;
on a wrist mounted computing device;
on an eye-wear system, e.g. electronic glasses used for augmented reality.

At least one further embodiment is further directed to where the keyword to be detected is one of the following spoken word types:

1. A first name (i.e. a "given name" or "Christian name", e.g. "John", "Steve", "Yadira"), where this is the first name of the earphone wearer.
2. A surname (i.e. a second name or "family name", e.g. "Usher", "Smith"), where this is the surname of the earphone wearer.
3. A familiar or truncated form of the first name or surname (e.g. "Johnny", "Jay", "Stevie-poos").
4. A nickname for the earphone wearer.
5. An emergency keyword not associated with the earphone wearer, such as "help", "assist", "emergency".

At least one further embodiment is further directed to where the ASM signal directed to the KDS of step 2 is from a different ambient sound microphone to the ASM signal that is processed with the ASM gain of step 6.

At least one further embodiment is further directed to where the AC gain of step 3 is frequency dependent.

At least one further embodiment is further directed to where the ASM gain of step 4 is frequency dependent.

FIG. 4 illustrates at least one further embodiment which is directed to a method 400 for automatically initiating a phone call in response to a detected keyword in the ambient sound field of a user, the steps of the method comprising:

Step 1 (410): Receive at least one ambient sound microphone (ASM) signal buffer and at least one audio content (AC) signal buffer.

Step 2 (420): Directing the ASM buffer to keyword detection system (KDS), where the KDS compares 430 keywords that are stored in processor accessible memory 440 and determines whether a keyword is detected 460 or not 450, when comparing the ASM buffer to the keywords.

Step 3 (470): Associating a list of at least one phone numbers with a list of at least one keywords, by comparing the detected keyword to processor assessable memory (470, e.g., RAM, cloud data storage, CD) that stores phones numbers associated with a keyword.

Step 4 (480): Calling the associated phone-number when a keyword is detected.

Note that various methods of keyword detection can be used and any description herein is not meant to limit embodiments to any particular type of KDS method.

The invention claimed is:

1. The method for modifying audio content in response to a keyword comprising:
   receiving an ear canal microphone (ECM) signal;
   receiving an ambient sound microphone (ASM) signal;
   receiving an audio content (AC) signal;
   comparing the ECM signal to a keyword and if the ECM signal matches the keyword then modifying an ASM gain and if the ECM signal does not match the keyword then the ASM signal is compared to the keyword and modifies the ASM gain if the ASM signal matches the keyword;
   applying the ASM gain to the ASM signal generating a modified ASM signal; and
   modifying an audio content gain if the ASM gain is modified.

2. The method according to claim 1 further including:
   sending the modified ASM signal to a speaker.

3. The method according to claim 1 further including:
   applying the audio content gain to the audio content signal generating a modified audio content signal.

4. The method according to claim 3 further including:
   sending the modified audio content signal to the speaker.

5. The method according to claim 3 further including:
   mixing the modified audio content signal with the modified ASM signal forming a mixed signal.

6. The method according to claim 5 further including sending the mixed signal to the speaker.

7. The method according to claim 1 wherein the keyword is a user's name, wherein the audio content gain is reduced in value and the ASM gain is increased.

8. The method according to claim 1 wherein the keyword is a user's name, wherein if the ASM gain is modified then the ASM gain is increased in value.

9. The method according to claim 1, wherein if the ASM gain is modified then the audio content gain is decreased in value.

10. The method according to claim 1 further comprising: detecting whether the keyword was uttered by a user.

11. The method according to claim 10, wherein if the keyword was uttered by the user and the ASM gain is modified then the audio content gain is decreased in value, the ASM gain is increased in value.

12. The method according to claim 11 further including: applying the audio content gain to the audio content signal generating a modified audio content signal.

13. The method according to claim 12 further including: mixing the modified audio content signal with the modified ASM signal forming a mixed signal.

14. The method according to claim 13 further including: sending the mixed signal to the speaker.

15. The method according to claim 10, wherein the keyword is a voice command.

16. The method according to claim 15, wherein the voice command is to call a phone number.

17. The method according to claim 16, wherein the voice command includes the phone number to call.

18. The method according to claim 17, further comprising:
calling the phone number.

19. The method for modifying audio content in response to a user input comprising:
receiving an ambient sound microphone (ASM) signal;
receiving an audio content (AC) signal;
receiving an ear canal microphone (ECM) signal;
detecting a keyword using the ECM signal and if detected then modifying the AC signal, by reducing it's volume, generating a modified AC signal;
receiving a user input to adjust an ASM gain of the ASM signal;
adjusting the ASM gain in response to the user input;
applying the ASM gain to the ASM signal generating a modified ASM signal;
mixing the modified ASM signal with the modified AC signal if the modified AC signal exists, otherwise mixing the modified ASM signal with the AC signal, to generate a modified AC signal; and
sending the modified AC signal to a speaker.

20. The method according to claim 19, where the user input is obtained by the user setting the amount of ambient passthrough using a GUI on a communication device.

* * * * *